Oct. 2, 1951  V. URBAN  2,570,168
BLENDING OF DRY POWDERED MATERIALS
Filed Dec. 29, 1949  3 Sheets-Sheet 1

Inventor
Victor Urban
By Robert E. Burns
Attorney

Oct. 2, 1951 V. URBAN 2,570,168
BLENDING OF DRY POWDERED MATERIALS
Filed Dec. 29, 1949 3 Sheets-Sheet 2
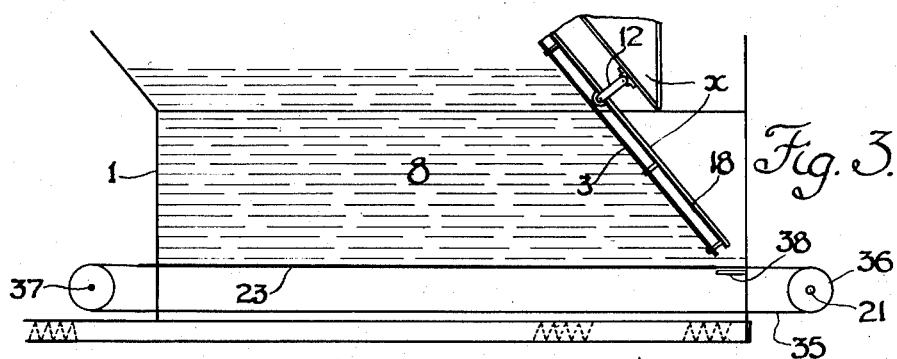
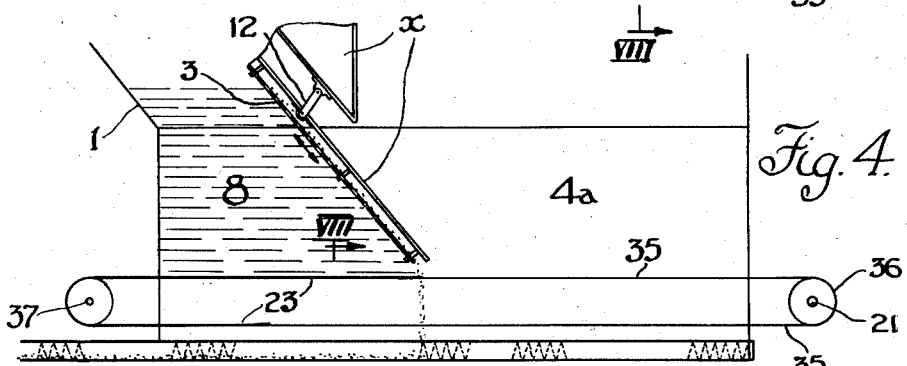
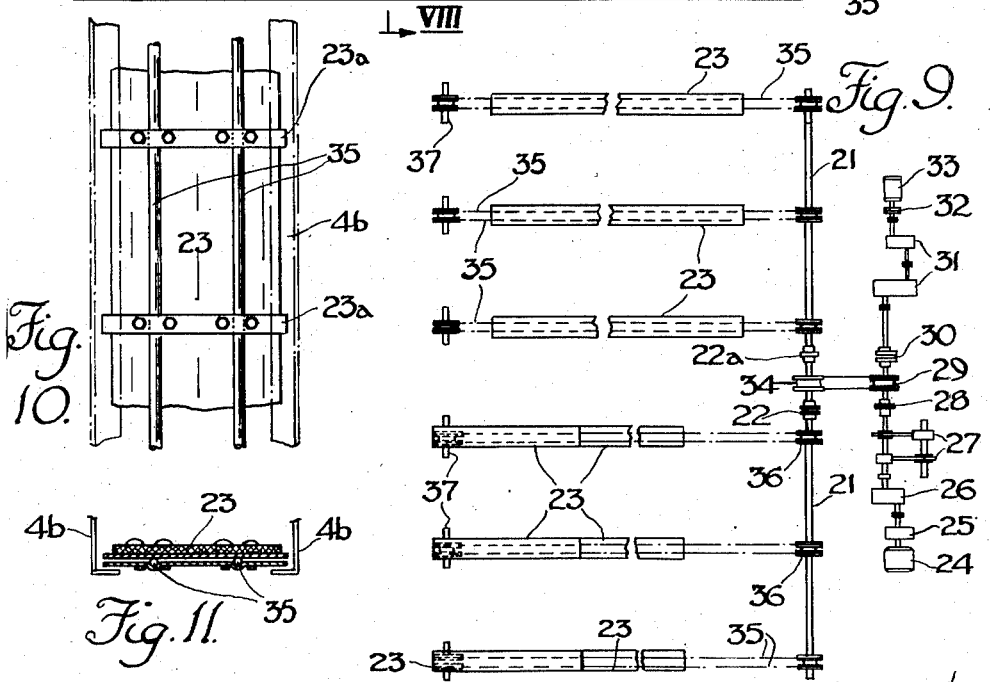
Inventor
Victor Urban
By Robert E. Burns
Attorney Inventor
Victor Urban
By Robert E. Burns
Attorney Patented Oct. 2, 1951

2,570,168

UNITED STATES PATENT OFFICE 2,570,168

BLENDING OF DRY POWDERED MATERIALS

Victor Urban, Pretoria, Transvaal,
Union of South Africa

Application December 29, 1949, Serial No. 135,707
In Union of South Africa January 13, 1949

20 Claims. (Cl. 259—1)

This invention relates to the blending of dry powdered or granular materials or finely subdivided materials generally, and is of particular application to the preparation of raw materials for the so-called dry process of Portland cement manufacture with the object of obtaining constant and controlled blending of the calcareous and argillaceous and/or other silica-, alumina- or iron oxide-bearing raw materials used in that manufacture.

A further application in the cement industry is the homogenisation of large stocks of cement for despatch, in order to average out any and all of the unavoidable irregularities of the degree of burning, fineness of grinding, gypsum addition, etc.; thus ensuring a product of the highest standard and unvarying quality.

The importance of homogeneity and constancy of composition of the ingredients of such raw materials as subjected to kiln treatment is well understood, as also is that of intimacy of contact of the particles, and if these conditions are not achieved down to the smallest portions of the material, a really high grade or perfect cement clinker is unobtainable. Dry raw mixtures, the composition and nature of which of necessity fluctuate very considerably according to the sources of supply of minerals, when charged into a storage bin quite readily form more or less even horizontal layers, being fluid by virtue of entrained air; and consolidation of the layers takes place as the entrained air escapes and the charge settles. The method of discharge of the material from such a bin, however, has hitherto been such that the discharged material at any time has not been of the average composition of the whole bin content but has varied rather in accordance with subsequent additions to the bin which gravitate to the outlet substantially without disturbing materials of the original charges which have, from the nature of the method of discharging, remained in the bin. Multiplication of the numbers of bins, the consecutive charging thereof and the continuous discharging from all of them does not satisfactorily overcome this difficulty; and attempts to do so by compressed air disturbance of the bin contents or even a distinct mixing thereof by increasing the air flow have afforded only a partial solution and have proved much too expensive for adoption in connection with the handling of materials on the large scale associated with cement manufacture.

According to the invention a bin charged with dry powdered materials, more especially of the kinds and in the manner above indicated, is discharged by a method ensuring that the discharged materials are continuously a true average of the bin contents.

More particularly the discharge is effected in such a way, and by such means, that parts of initial and superimposed subsequent layered charges in the bin are all simultaneously disturbed by a form of slicing action for gravity discharge in intermixed condition up to more or less complete exhaustion of the bin contents.

The means employed may consist of one or more members extending across and upwardly through the bin at an angle of the same order as the average angle of repose of the bin contents and subjected to a combination of up and down and translatory movement into the body of materials to exert thereon a loosening action over the full depth thereof.

As has been already indicated the bin will contain successive horizontal layers of the powder, each layer being of a uniform or practically uniform composition within itself, yet layer by layer varying in the proportion of the respective ingredients. If a thin vertical section is taken, then the composition of this section will be the true average of all the others completely related to their relative thickness. If now instead of the section being vertical it is inclined at an angle the same argument applies and the results of that angled section will also be the true average of the contents of the bin. According to our invention a section is taken roughly at the angle of repose e. g. from about 48° to 58°, with materials of the kinds above referred to, and in order to achieve this we cause an arrangement such as a screen of wires to oscillate against the surface of the powder and this movement, by a form of slicing action, breaks down the internal friction of the powder, aerates and fluidizes it, and causes it to flow as it does in a cascade, down the surface and into the bottom, whence it is removed.

The angle of the plane of the wires is slightly less than the actual angle of repose of the powder, so that the powder always bears up against the wires. The wires are also caused to advance against the face of the powder so that materials from the successive layers are dislodged simultaneously. It is convenient to use a square mesh wire screen supported by a rigid frame, or frames, and the oscillation achieved by mechanical means from the top. In testing this device in a form and a scale adequate to the results sought, alternative layers of varying thickness of powdered raw material of 76.9% and 93.2% total carbonate were formed, and on operating the wire slicing apparatus the variation of the product was only between 83.9% and 84.3% over the whole length of the bin.

An example of an application of the invention on a scale of the order common in cement manufacture, is illustrated in the accompanying drawings, in which like references denote like parts in the several views and in which:

Figures 3 and 4 are diagrammatic longitudinal sections illustrative of the bin-discharging method and the functioning of apparatus shown in Figures 1 and 2;

Figure 9 is a diagrammatic plan of the devices arranged below the two-bin arrangement of Figures 1 and 2 for control of discharge openings, and showing a main driving gear arrangement for the whole discharging apparatus;

Figure 10 is a fragmental underside view to a larger scale of a discharge control device; and Figure 11 is a cross-section thereof, as denoted by VIII—VIII above referred to.

Figure 1:
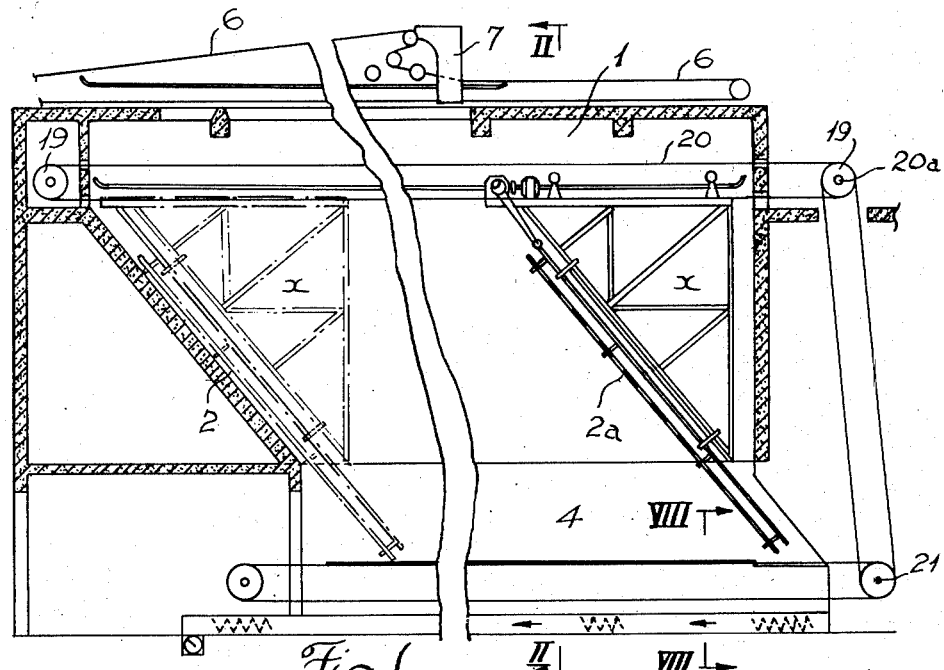
Figure 1 is a semi-diagrammatic vertical longitudinal section (broken in length for convenience) of a suitable construction of bin, charging and discharging apparatus suitable for carrying this invention into effect.
Figure 2:
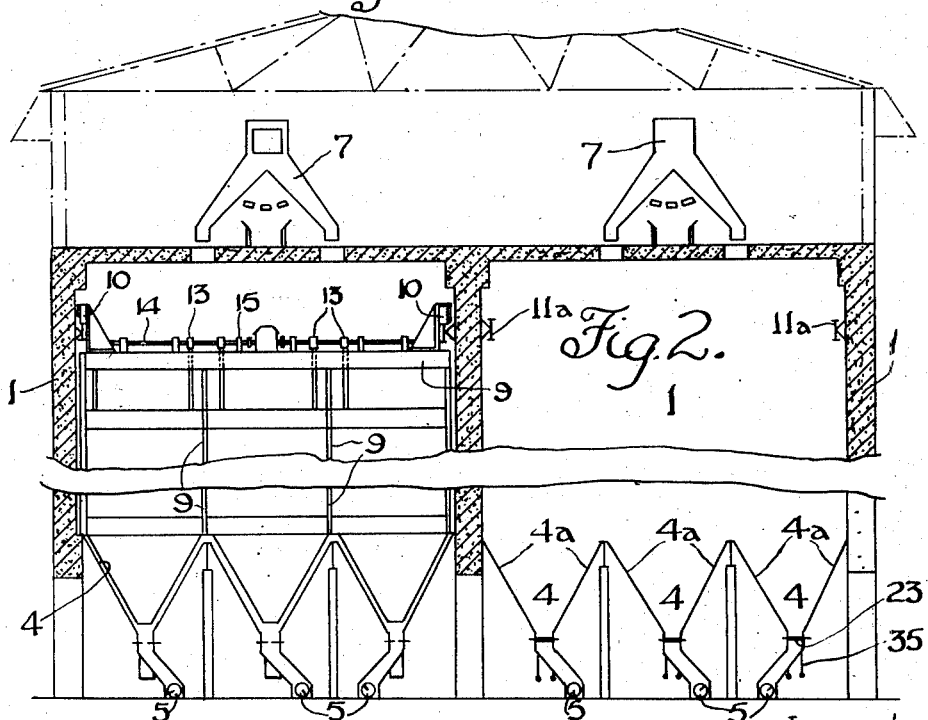
Figure 2 is a cross-section on the line and in the direction of the arrows II—II of Figure 1, showing two distinct bins providing for alternate charging and discharging and continuity of operation of the bins collectively.

Referring now to these drawings, and first omitting items of a detailed nature, the bin 1 may be constructed in any way to a generally rectangular plan form, internally some 90–100 ft. long, about 24 ft. wide, and 20 to 25 ft. high and a screen 2 is so provided therein as to stretch across the interior for the full height of contents in a plane at an angle of about 50°.

The base of the bin 1 is formed with a plurality, e. g. three contiguous parallel longitudinal trough portions 4 with convergent flat sides as 4a inclined at about 60° or more leading into tunnels of a corresponding number of screw conveyors 5 together forming the means of discharging the materials falling from the bulk above them.

The screen 3 is so mounted as to provide for both a general translatory movement thereof from end to end of the bin and simultaneous oscillatory or reciprocatory up and down movement substantially in its own plane, the number of strokes being of the order of 60 per minute, and their length about 1½", the mechanism for effecting such movements being of any suitable kind preferably arranged above the bin contents and operating generally after the fashion, so far as general movement of the screen is concerned, of a travelling overhead crane with the screen suspended conveniently from it.

The screen may consist generally of a rectangular framed structure of the requisite outside dimensions and any suitable strong construction consisting mainly of square wire mesh using wires of about 0.162" gauge and 1" square openings.

In use the screen is placed in the farthest position (shewn in broken lines at 2a in Figure 1), say to the right hand end of the bin, and the powdered raw material is fed in to the top of the bin to the left.

When the bin is full, the slicing screen mechanism will be put into action and the powdered raw material mixture cascading downwardly of the screen will be discharged into the tunnels in which the screw conveyors rotate.

The screen 3 is advanced progressively and slowly along the inside of the bin (towards the left in the case given) against the retiring sloping face section of the material with ultimate discharge of substantially the entire contents.

The end wall of the bin is preferably formed as shewn at the same slant as the screen whereby to eliminate any dead pocket of material below the screen when it has reached the limit of its active traverse, as would occur were that wall upright, the said material then having to be removed by other means if not allowed, as generally undesirable, to remain indefinitely in the bin.

The screen is then returned to the opposite (right hand) end prior to recharging of the bin as above described.

Adjustment of the angle of the screen may preferably be provided for to adapt it to correct action upon materials of different angles of repose; in which connection the vertical cross-section of the bin should be rectangular from top to bottom and side convergences 4a to angles of the order of those just referred to limited to the immediate vicinity of the discharging conveyors or the like at the base.

In width the screen may be divided into independently oscillatable sections, e. g. three or more, and whilst moving bodily as one along the bin, they should preferably oscillate out of phase with one another thus simplifying the drive by balancing the loads on the driving motor or other system.

The method and means for charging the material evenly and layerwise into the bin may follow known practice, e. g. using suitable airlift pump means, such as a Fuller Kinyon pump; or bucket elevator and screw conveyor; arranging in either case for automatically operated and staggered discharge, at suitable intervals, over the whole length of the bin.

As the rate of extraction from such an averaging bin depends on the speed and amplitude of the oscillation of the slicing device and on the pressure with which it bears against the surface of material, it is obvious that these factors and the extracting rate of the screw conveyors must be synchronised.

A system of two averaging bins as described will render both charging and discharging, continuous processes.

In the specific construction of apparatus illustrated, in describing which the screen or screens, frames thereof and travelling structure by which they are moved, are collectively termed the slicer, the dry powdered raw materials are fed into the storage bin 1 by means of a belt conveyor 6, as shewn in Figure 1, which conveyor is fitted with a travelling tripper 7 adapted to travel longitudinally backwards and forwards along the top of the bin, whereby to discharge the raw mix into the latter in a succession of layers as indicated by 8 in the diagrammatic Figure 3.

Before the bin is charged in this way the slicer, denoted by reference X, is moved to one end as shewn so that the mix is built up immediately against it.

Figure 5:
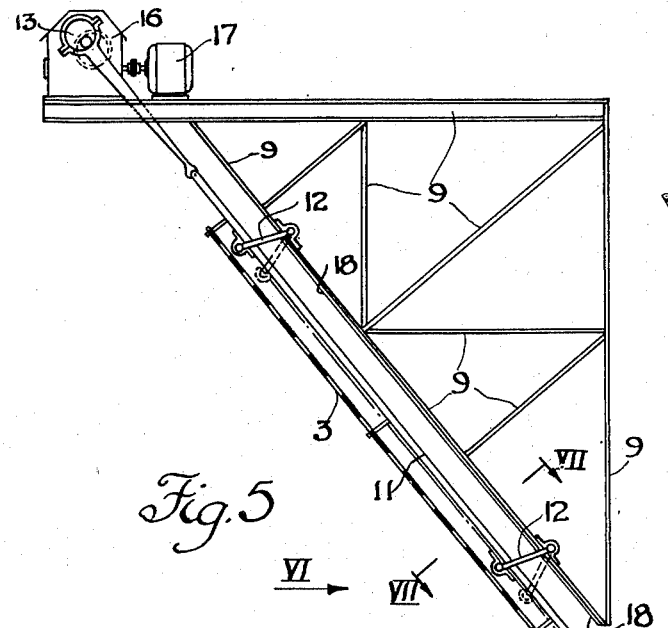
Figure 5 is a larger scale side elevation of the device or slicer.
Figure 8:
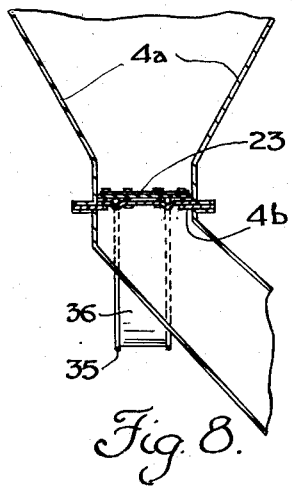
Figure 8 is a cross-section of a lower part of the bin, viewed as indicated by VIII—VIII in any of Figures 1, 3 and 4, and showing a device controlling a basal discharge opening.
Figure 6:
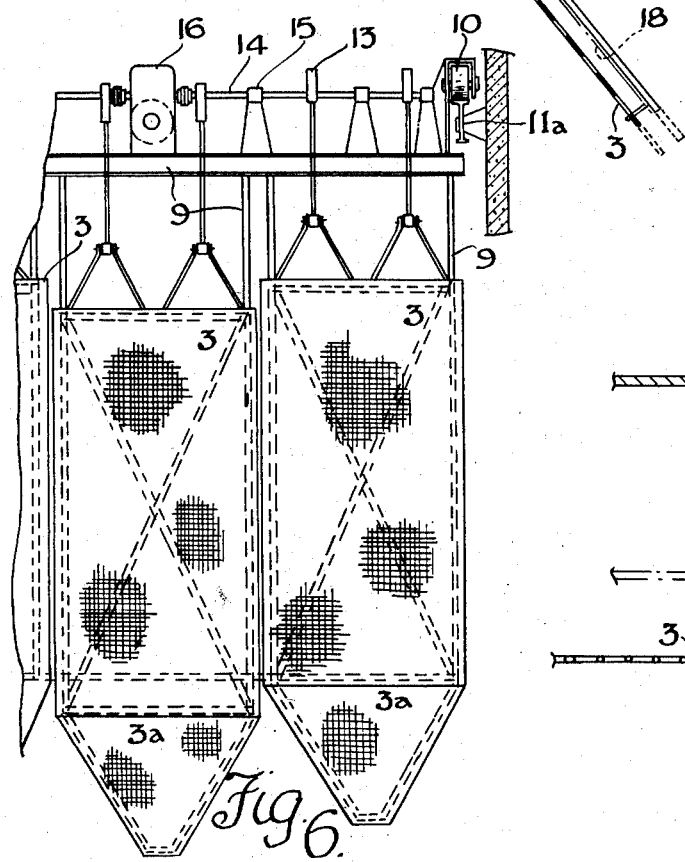
Figure 6 is a fragmental elevation of the device shown in Figure 5, looking in the direction of arrow VI, showing how the device is supported for traversing the bin.
Figure 7:
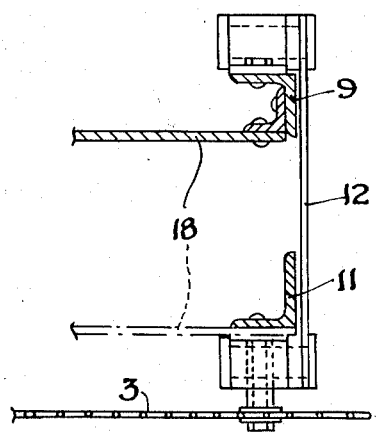
Figure 7 is a fragmental cross-section on the line VII—VII of Figure 5, showing the construction in some detail.

The slicer, which is shewn in some detail in Figures 5 and 6, comprises a rigid steel structure 9 supported from a system of rollers 10 running on rail 11a fixed along the upper parts of the side walls of the bin. Attached to the sloping front of the structure are three similar separably movable frames 11, each of which carries in the manner best illustrated in Figures 5 to 7, a mesh screen of the kind already described. The three screens are arranged in a single plane and are connected to the structure 9 by pivoted arms 12.

The oscillative movement is imparted to the screens through eccentrics 13 arranged on a pair of overhead shafts 14, mounted in journals 15, erected on the upper part of the framework 9, which shaft is driven through a suitable reduction gear 16 to which a drive is applied from an electric motor 17.

Each of the screens 3 is driven by a pair of the eccentrics and preferably these pairs are set at 120° for the sake of balance, the three screens thus operating at 120° out of phase with one another.

It will be observed that each screen is provided with a downwardly extending convergent or tapered portion 3a which enters one or other of the trough portions 4 of the bin. Furthermore, in order to prevent raw material powder in its fluid condition before it settles from passing through the screens when they are stationary during the filling of the bin, an imperforate baffle plate as 18 e. g. aluminium sheeting is provided which may either be attached to the sloping part of the structure 9 or if desired may, as shown in the broken lines in Figure 7, be attached to the framework 11 forming the mounting for the screen 3 and oscillated therewith. The baffle plate is substantially co-extensive with the slicer screen and although it may lie substantially parallel therewith it may lie, if desired, at a lesser angle, leaving a space between it and the screen which widens from top to bottom.

The slicer has to travel longitudinally at a slow speed as the face of the raw material powder recedes, so that when the bin is empty, after, for example, some 16 hours of working in the case of the large size bins illustrated, the slicer reaches the broken line position 2 in Figure 1 or a position somewhat beyond that in which it is shown in Figure 4. Before the bin can be refilled in the manner above explained the slicer has to be returned to its original starting position as shown in Figure 3, or at 2a in Figure 1. For obtaining this drive two sprockets or chain wheels 19 are mounted on shafts and bearings at each end of the bin, a chain or like drive 20 being connected to the slicer and passing over the sprockets. The sprocket shaft 20a at one end is then driven from a countershaft 21, which is best seen in Figure 9, the shaft 21 extending across one end of the bin close to the floor level and substantially opposite to the discharge openings from the bin.

The shaft 21 which also serves for the operation of devices for the control of the discharge from the bins hereafter to be described, is divided into three sections by means of clutches 22 and 22a as shown in Figure 9. The main drive to the counter-shaft 21 comprises an electric motor 24, fluid coupling 25, reduction gear-box 26, two ratchet reductions 27 (for obtaining a substantial step-down ratio) clutch 28, chain sprocket 29, clutch 30, two reduction gear boxes 31, fluid coupling 32 and electric motor 33, all arranged substantially as shown in Figure 9. When the clutch 28 is engaged, clutch 30 is disengaged and the slicer mechanism of either of the two bins may be driven through the counter-shaft 21 by engaging or disengaging clutches 22 and 22a as required.

Items 24 to 27 inclusive are employed when a slow travel is required for the slicing of the raw material, by engaging the clutch 28 and disengaging the clutch 30. For the return of the slicer mechanism to its starting position, and this at a very much higher speed, clutch 28 is disengaged and clutch 30 engaged, the drive then taking place through items 31, 32 and 33. Sprockets 29 and 34 constitute the connection between the countershaft 21 and the main driving system.

Returning now, to Figures 3, 4 and 9, under each section 4 in each bin a continuous slot-like opening is provided for the discharge of the material and the extent to which such slot is opened is governed by a belt-like member 23 which is mounted on a double endless chain or arrangement of cables 35, which pass over terminal chain wheels or pulleys on the said shaft 21 and the other shaft as 37. In response to rotation of the shaft 21 the belt 23 which originally occupies the position shown in Figure 3 and, therefore, closes the discharge opening from the bin over its whole length from just under the trailing lower part of the slicer X is moved through the position in which it is shown in Figure 4, that is to uncover the discharge opening just behind the slicer as it advances.

For each bin as shown there are three such extraction belts and these are all synchronised with the travel of the slicer so that when the slicer is operating the raw material or other such finely divided material is prevented from discharging into the conveyors 5 except around behind the slicer. The action will be clear from Figure 4 in which material which has passed through the meshes of the screen is seen falling into the conveyor. Although the construction of the belts 23 may vary a specific form is shown in Figures 10 and 11 wherein the belt 23 is seen to be mounted on cables 35 by an arrangement of stiffening cross straps as 23a and supported marginally over its top run below the bin by an arrangement of angle iron rails or the like, 4b.

Adverting to Figure 3, with the slicer in the position shown some of the material as it is being fed into the bin in layers passes through the meshes of the screen and to some extent may fill the space between the latter and the baffle plate 18. Such material passing through the screen in this way may constitute a sufficient load to render the starting of the slicer somewhat difficult. It is desirable, therefore, that the slicer should, during filling, occupy a position slightly forwards of the near end of the bin, so that it can be withdrawn in that direction after the bin is filled, causing material which may have passed through the screen to flow downwardly into the corner of the bin, whence it may be admitted to the conveyor for disposal by temporary withdrawal or displacement of a gate or the like 38; whereupon the slicer may be started into its motion for the discharge of the contents of the bin in the manner already explained.

It is to be understood that various modifications and additions may be introduced into the apparatus employed in and forming part of the present invention, which is not limited to what has been already set forth herein with reference to the drawings. For example, instead of wire mesh screens, suitably perforated plate may be used.

In place of the mesh or perforate material, a screen may comprise slatted members, generally of the same arrangement as the slats in a Venetian blind, and the slats may be so arranged if desired, to provide a feathering action in rising against the finely divided material, tilting into edgewise engagement therewith during the downstroke. The slats may be wide enough that when in the feathered position they meet edge to edge or overlap to present a closed baffle, and they may thus serve the purpose of the imperforate baffle aforesaid. In the matter of projecting the flow of material during filling of the bin through the meshes of the screen or screens, or with a view to reducing the amount of material so flowing, other means may be used than a baffle plate such as 18, as already described, and it may suffice to keep the screen sections covered over during the filling operation by, for example, a light canvas-covered frame or frames, which may, if desired, be applied only temporarily when the slicer is in its starting position; or temporary closures after the fashion of roller blinds, or of slatted blinds, may be employed.

Also, although the construction of bin is preferred which, as above described, comprises belts for the control of the discharge of material from the lower parts of the bin, it may be possible from the nature of the materials being handled to dispense with such belts or the like and to rely on the material packing in the trough portions of the bin in such a way as not to enter the conveyor until the slicer has acted thereon. In this connection, or if desired with the object of relieving the belts where these are provided from at least some of the load of the material above mentioned, each trough above its corresponding conveyor may, if desired, be longitudinally bifurcated as by means of inverted girders or the like of a V or other section, for instance V-section of apex angle about 60° or less, over each side of which members the material may bear as well as against the aforementioned convergent surfaces 4a in the base of the bin. It will be understood that where such girders or the like are provided they serve to transmit the overhead weight of the unextracted material generally against the bottom of the bin construction, whereas such material might otherwise exert its entire weight, or a substantial part thereof, on the screw conveyors with obvious disadvantages.

Materials of a similar character to those specifically referred to above and to which this invention may equally well apply, include mixtures for the ceramic, glass and pigment industries.

What I claim is:

1. Apparatus for the blending of finely subdivided dry material comprising a bin of any capacity, generally quadrangular plan form and substantially constant cross-section between its ends, means for feeding the material into said bin in uniform superimposed layers, a screen of stiff construction extending into and across said bin between its ends, of a form such as to divide the bin into two lengthwise in a plane at an angle to the horizontal of the same order as the angle of repose of the said material, means for traversing said screen forwardly inclined in the bin in a lengthwise direction thereof, means for imparting oscillatory movement to the screen substantially in its own plane contemporaneously with the traversing thereof, said bin comprising from end to end thereof, downwardly convergent basal surfaces leading into at least one slot-like discharge opening, and a conveyor device extending along and below such discharge opening for the reception and disposal of materials gravitating into the same from the bin interior.

2. Apparatus according to claim 1, wherein said screen comprises open-mesh material mounted across a frame of rigid construction, which frame depends from and is mobile along rail or like means in overhead arrangement along the bin between its ends, means being provided for traversing the said frame in either direction along said rail or like means.

3. Apparatus according to claim 1, wherein the said screen is mounted across a frame of rigid construction movable along the bin between its ends, and means is provided for imparting said oscillatory movement from the frame to the screen.

4. Apparatus according to claim 1 wherein said screen is mounted across a frame of rigid construction movable along the bin between its ends, and a plain imperforate sheet-like baffle member substantially coextensive with said screen and in a parallel spaced relationship thereto is mounted on said frame or otherwise provided as a material-excluding partition across the bin e. g. to the rear of the screen in the sense of its traverse as aforesaid.

5. Apparatus according to claim 1 wherein several pairs of said convergent surfaces define a plurality of parallel trough-like basal portions of the bin, each of which is provided with a discharge opening and an associated conveyor as aforesaid.

6. Apparatus according to claim 1 wherein the screen comprises a lower portion entering between said convergent basal surfaces for engagement with material contained within them.

7. Apparatus according to claim 1 wherein the screen comprises a plurality of relatively movable co-planar sections adapted to perform said oscillative movement out of phase with one another whilst being traversed together.

8. Apparatus according to claim 1 wherein the screen comprises a plurality of relatively movable co-planar sections separately oscillatable whilst being traversed together, each of said sections having tapered lower portions respectively entering between a pair of said convergent basal surfaces for engagement with material within them.

9. Apparatus according to claim 1, comprising a member extensible below and along the length of said slot-like discharge opening as a closure therefor and retractible therefrom with traverse of the screen in said lengthwise direction of the bin progressively to uncover the said opening in the rear of the screen in its said traverse.

10. Apparatus according to claim 2 wherein the said screen is mounted across a frame of rigid construction movable along the bin between its ends, and means is provided for imparting said oscillatory movement from the frame to the screen.

11. Apparatus according to claim 2 wherein several pairs of said convergent surfaces define a plurality of parallel trough-like basal portions of the bin, each of which is provided with a discharge opening and an associated conveyor as aforesaid.

12. Apparatus according to claim 2 wherein the screen comprises a plurality of relatively movable co-planar sections adapted to perform said oscillative movement out of phase with one another whilst being traversed together.

13. Apparatus according to claim 3 wherein said screen is mounted across a frame of rigid construction movable along the bin between its ends, and a plain imperforate sheet-like baffle member substantially coextensive with said screen and in a parallel spaced relationship thereto is mounted on said frame or otherwise provided as a material-excluding partition across the bin, e. g., to the rear of the screen in the sense of its traverse as aforesaid.

14. Apparatus according to claim 3 comprising a member extensible below and along the length of said slot-like discharge opening as a closure therefor and retractible therefrom with traverse of the screen in said lengthwise direction of the bin progressively to uncover the said opening in the rear of the screen in its said traverse.

15. Apparatus according to claim 4 wherein the screen comprises a lower portion entering between said convergent basal surfaces for engagement with material contained within them.

16. Apparatus according to claim 4 comprising a member extensible below and along the length of said slot-like discharge opening as a closure therefor and retractible therefrom with traverse of the screen in said lengthwise direction of the bin progressively to uncover the said opening in the rear of the screen in its said traverse.

17. Apparatus according to claim 5 wherein the screen comprises a plurality of relatively movable co-planar sections separately oscillatable whilst being traversed together, each of said sections having tapered lower portions respectively entering between a pair of said convergent basal surfaces for engagement with material within them.

18. Apparatus according to claim 6 wherein the screen comprises a plurality of relatively movable co-planar sections adapted to perform said oscillative movement out of phase with one another whilst being traversed together.

19. Apparatus according to claim 8 comprising a member extensible below and along the length of said slot-like discharge opening as a closure therefor and retractible therefrom with traverse of the screen in said lengthwise direction of the bin progressively to uncover the said opening in the rear of the screen in its said traverse.

20. Apparatus according to claim 19 wherein said member forming a closure for said slot-like discharge opening comprises an endless flexible member presenting an imperforate run alignable along the length of said opening and displaceable progressively therefrom in the said lengthwise direction of the bin.

VICTOR URBAN.

REFERENCES CITED

The following references are of record in the file of this patent:

UNITED STATES PATENTS

| Number | Name | Date |
|---|---|---|
| 1,720,112 | Allen | July 9, 1929 |
| 1,842,245 | Bucaro | Jan. 19, 1932 |
| 2,281,497 | Hyson et al. | Apr. 28, 1942 |
| 2,385,494 | Boynton | Sept. 25, 1945 |